United States Patent
Clee et al.

[11] Patent Number: 6,029,248
[45] Date of Patent: Feb. 22, 2000

[54] LOCKING SYSTEM TO PROTECT A POWERED COMPONENT INTERFACE FROM ERRONEOUS ACCESS BY AN ATTACHED, POWERED-OFF COMPONENT

[75] Inventors: James Thomas Clee, Orefield, Pa.; Eugene Joseph Yurek, Hazlet, N.J.; Yi Liang, Baldwin Park; Walter G. Soto, Irvine, both of Calif.

[73] Assignee: Lucent Technologies Inc. Corporation, Murray Hill, N.J.

[21] Appl. No.: 08/990,248

[22] Filed: Dec. 15, 1997

[51] Int. Cl.[7] ...................................................... G06F 1/00
[52] U.S. Cl. ........................ 713/320; 713/300; 713/320; 713/340
[58] Field of Search ........................ 395/183.14, 183.04, 395/183.09, 183.05, 183.16, 885, 889, 890, 892, 823, 726, 733, 856

[56] References Cited

U.S. PATENT DOCUMENTS

| | | | |
|---|---|---|---|
| 5,630,052 | 5/1997 | Shah | 395/183.14 |
| 5,675,813 | 10/1997 | Holmdahl | 395/750 |
| 5,729,760 | 3/1998 | Poisner | 395/823 |
| 5,818,948 | 10/1998 | Gulick | 381/77 |

*Primary Examiner*—Ayaz R. Sheikh
*Assistant Examiner*—Tim Vo

[57] ABSTRACT

A system which utilizes a control interface of a powered component of a device to protect said component from being corrupted by random values which may be present on the control interface as a result of powering off or powering on an attached device component. When the powered component powers off the attached component, the powered component is locked and ignores any control sequences from the attached component until the attached component is powered back on and the attached component sends a correct unlock sequence to the control interface to unlock the powered component.

1 Claim, 2 Drawing Sheets

LOCKING SYSTEM TO PROTECT A POWERED COMPONENT INTERFACE FROM ERRONEOUS ACCESS BY AN ATTACHED, POWERED-OFF COMPONENT

FIELD OF THE INVENTION

The present invention is directed generally towards a system which uses existing control signals between components of a device to maintain system integrity during and after a period where certain of those components are powered off. More specifically, the present invention is directed towards a system which utilizes a control interface of a powered component to protect said component from being corrupted by noise introduced by an attached, powered-off component.

BACKGROUND OF THE INVENTION

Efforts to lower utility bills have led businesses to require that certain devices such as computers, printers, modems, etc., be powered-off when they are not being used. Similarly, in some locales throughout the world, constraints on available sources of power require that certain devices be powered off when not being used so that the available power can be allocated to other devices which are being used. Although such efforts to conserve power have the benefit of lowering utility bills, such efforts also result in an unintended problem. Specifically, when a device has some components which are powered off while at least one of its components remains powered, the powered component can be corrupted by noise introduced by the powered-off components. Such noise can also be introduced when the powered-off components are powered back on.

At present there are no conventional systems for addressing this problem. Accordingly, there exists a need for a system which protects a powered component of a device from being corrupted by noise introduced by attached powered-off components. It is therefore an object of this invention to provide such a system.

SUMMARY

In accordance with the present invention there is provided a system for protecting the control interface of a powered component of a device from being corrupted by noise introduced when an attached component is powered on or off. When the attached component is powered off, the powered component is locked such that it will not execute any instructions issued by the attached component until the powered component restores power to the attached component and the attached component sends a correct unlock sequence to the control interface to unlock the powered component.

BRIEF DESCRIPTION OF THE DRAWINGS

A more complete understanding of the present invention may be obtained from consideration of the following description in conjunction with the drawings in which.

DETAILED DESCRIPTION OF THE INVENTION

Figure 1:
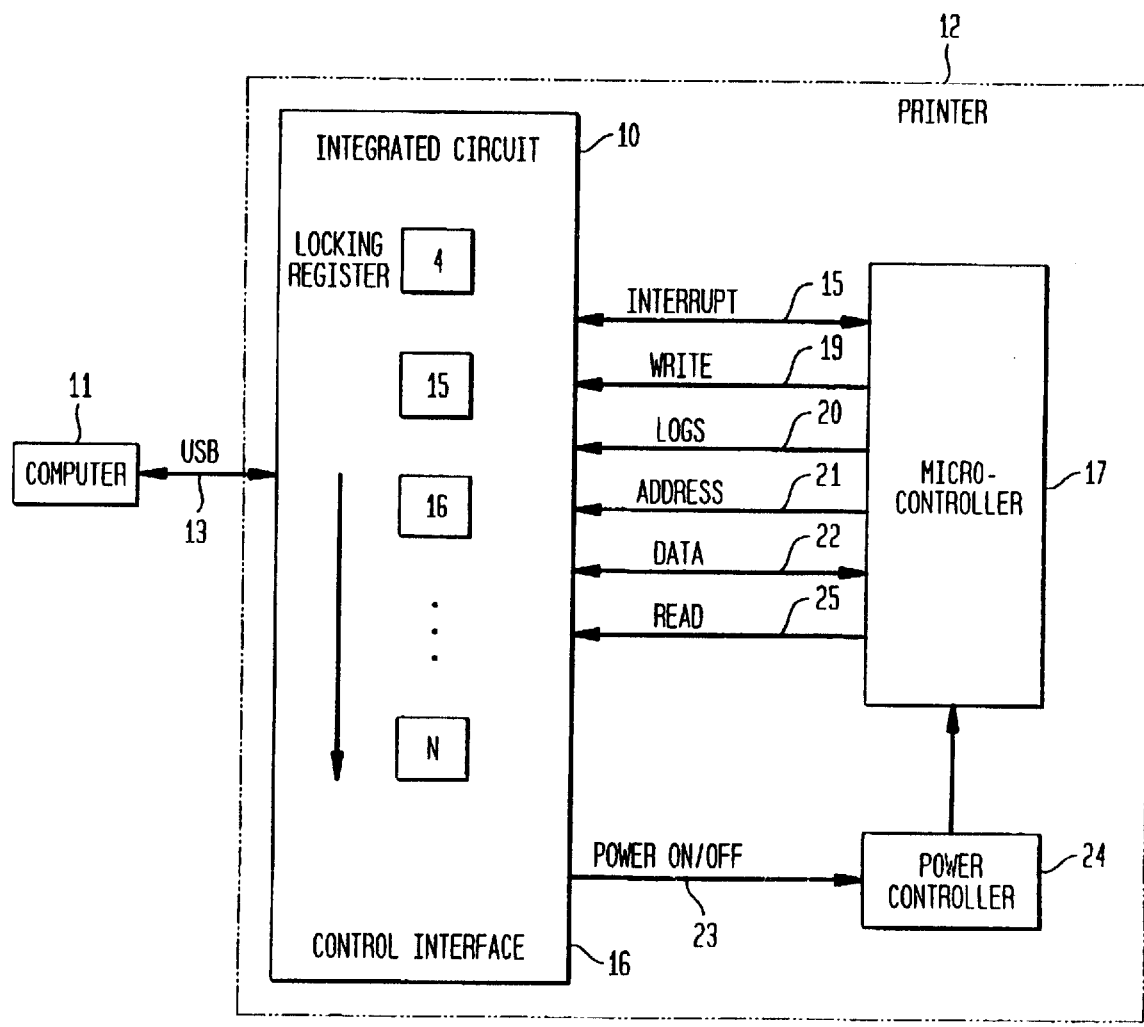
FIG. 1 shows a device containing an exemplary embodiment of the locking system for protecting a powered component interface from erroneous access by an attached, powered-off component according to the present invention.

Referring to FIG. 1, there is shown a device containing an exemplary embodiment of an integrated circuit 10 for implementing the locking system according to the present invention. A computer 11 is coupled to a printer 12 by means of a universal serial bus ("USB") 13 over which the computer 11 and the printer 12 communicate with one another. The printer 12 includes the integrated circuit 10 which implements the locking system by means of locking register 14. The integrated circuit 10 also includes registers 15 through n, which perform a plurality of functions and are each identified by a unique address.

The integrated circuit 10 includes a control interface 16 through which an attached microcontroller 17 and the integrated circuit 10 communicate with one another. The integrated circuit 10 asserts an interrupt line 18 advising the microcontroller 17 that it is to be powered off when the USB 13 is idle for more than 3 milliseconds. The microcontroller 17 then prepares to power down and asserts a write line 19, an input/output chip select line 20, an address line 21 and a data line 22 to advise the integrated circuit 10 that it is ready to be powered off. The integrated circuit 10 then asserts a power on/off line 23, simultaneously locking the locking register 14 and causing a power control 24 to power the microcontroller 17 off. The integrated circuit 10 will not execute any instructions issued by the microcontroller 17 when the locking register 14 is locked.

The integrated circuit 10 restores power to the microcontroller 17 when activity resumes on the USB 13. The integrated circuit 10 then de-asserts the power on/off line 23 causing the power control 24 to restore power to the microcontroller 17. The microcontroller 17 reinitializes itself and writes an unlock sequence to the locking register 14 comprised of a pre-defined series of data bits to the locking register 14 over the write line 19, the input/output chip select line 20, the address line 21 and the data line 22. The unlock sequence is comprised of 16 data bits. The unlock sequence can, however, be comprised of any number of bits. The actual unlock sequence required to unlock the locking register 14 is hardwired in when the integrated circuit 10 is fabricated.

The microcontroller 17 then reads the locking register 14 over the read line 25, the input/output chip select line 20 and the address line 21 to determine if it successfully unlocked the locking register 14. The microcontroller 17 has to unlock the locking register 14 in order to have access to the control interface 16 for normal operation of the printer 12. If it fails to unlock the locking register 14, the microcontroller 17 re-sends the unlock sequence to the locking register 14. When it successfully unlocks the locking register 14, the microcontroller 17 and the integrated circuit 10 are able to resume normal operation of the printer 12.

Figure 2:
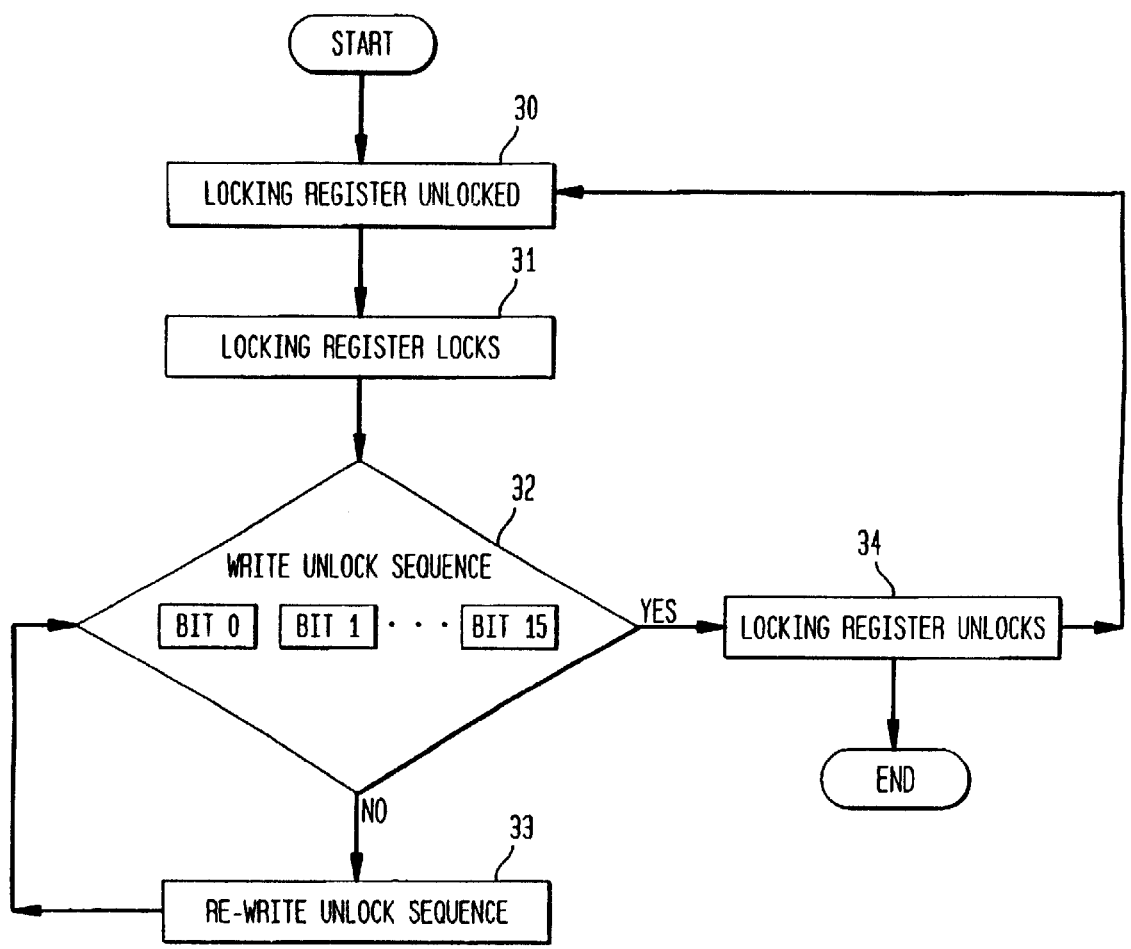
FIG. 2 shows a flow chart detailing the operation of the locking system of the device shown in FIG. 1.

Referring to FIG. 2, there is shown a flow chart depicting the locking and unlocking of the locking register 14. Starting at step 30, the locking register 14 is unlocked and the printer 12 is operating at normal power. At step 31, inactivity on the USB 13 causes the integrated circuit 10 to power off the microcontroller 17 and the locking register 14 is locked.

At step 32, the microcontroller 17 writes the unlock sequence to the locking register 14 after being powered back on by the integrated circuit 10 when activity resumes on the USB 13. The unlock sequence only unlocks the locking register 14 if the correct sequence of data bits are written to the locking register 14 and this correct sequence is detected by the integrated circuit 10. In order for the unlock sequence to be successful, there can be no intervening reads or writes to any registers including to the locking register 14. If any erroneous intervening reads or writes occur, then at step 33 the unlock sequence fails and the integrated circuit 10 detects this failure. The microcontroller 17 then rewrites the unlock sequence and the integrated circuit 10 looks anew for the correct unlock sequence.

However, if at step 32 the microcontroller 17 has successfully written the correct unlock sequence to the locking register 14, then ending at step 34 the locking register 14 unlocks, thereby allowing the microcontroller 17 to resume normal operation of the printer 12 at step 30.

The number of bits in the unlock sequence is chosen to be large enough to minimize the probability of having noise on the control lines appear to be the unlock sequence. The probability of a false signal being interpreted as a true unlock signal is also reduced by resetting the unlock sequence on intervening writes to registers other than to the locking register 14 and on intervening reads to any register including the locking register 14. Finally, the data sequence is chosen to be non-static and non-periodic to also minimize the probability of failure.

The invention, which is the subject of the present application, is fabricated as part of Lucent's USS820 chip, a USB device controller with a general-purpose microcontroller interface. This chip can be used in any number of devices including, but not limited to, computers, printers, modems, etc. This chip can also be used to control other integrated circuits.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed is:

1. A computer having a system for protecting a powered component from being corrupted by an attached, powered-off component, comprising:

an integrated circuit having a locking register; and a microcontroller coupled to said integrated circuit, said integrated circuit selectively powering said microcontroller on and off, wherein when said integrated circuit powers said microcontroller off said locking register is locked thereby preventing said integrated circuit from executing instructions issued by said microcontroller, said integrated circuit being coupled to a universal serial bus and including a control interface, said microcontroller being coupled to said control interface and accessing said integrated circuit through said control interface, said integrated circuit powering said microcontroller on and off through said control interface when said universal serial bus is idle for a specified period of time, and said integrated circuit including a plurality of registers and said control interface including a write line such that when activity resumes on said universal serial bus said integrated circuit powers said microcontroller back on and said microcontroller writes an unlock sequence of data bits to said locking register, wherein said integrated circuit resumes executing instructions issued by said microcontroller when said unlock sequence unlocks said locking register, said locking register remaining locked thereby preventing said integrated circuit from executing any instructions issued by said microcontroller when said unlock sequence fails to unlock said locking register, and said unlock sequence only unlocking said locking register when said correct unlock sequence is written to said locking register with no intervening writes by said attached component to any one of said registers other than said locking register and no intervening reads by said attached component to any one of said registers.

* * * * *